(12) United States Patent
Yoon

(10) Patent No.: US 11,448,394 B2
(45) Date of Patent: Sep. 20, 2022

(54) BOILER FEED TANK ENERGY RECAPTURE SYSTEM

(71) Applicant: Yong K. Yoon, Torrance, CA (US)

(72) Inventor: Yong K. Yoon, Torrance, CA (US)

(73) Assignee: Daniel Steam, Inc., Torrance, CA (US)

( * ) Notice: Subject to any disclaimer, the term of this patent is extended or adjusted under 35 U.S.C. 154(b) by 96 days.

(21) Appl. No.: 16/523,636

(22) Filed: Jul. 26, 2019

(65) Prior Publication Data

US 2020/0025367 A1 Jan. 23, 2020

Related U.S. Application Data

(62) Division of application No. 15/249,186, filed on Aug. 26, 2016, now Pat. No. 10,364,979.

(51) Int. Cl.
| | | |
|---|---|---|
| F22D 1/32 | (2006.01) | |
| F22D 1/36 | (2006.01) | |
| F22D 1/34 | (2006.01) | |
| F16T 1/00 | (2006.01) | |

(52) U.S. Cl.
CPC ............. *F22D 1/32* (2013.01); *F16T 1/00* (2013.01); *F22D 1/325* (2013.01); *F22D 1/34* (2013.01); *F22D 1/36* (2013.01)

(58) Field of Classification Search
CPC ..... F22D 1/32; F22D 1/36; F22D 1/34; F22D 1/325; F16T 1/00
USPC ................................................. 122/441, 442
See application file for complete search history.

(56) References Cited

U.S. PATENT DOCUMENTS

| | | | | |
|---|---|---|---|---|
| 1,441,507 A | * | 1/1923 | Jacobus | B01D 19/0042 122/412 |
| 1,628,471 A | * | 5/1927 | Moss | F22D 1/32 261/117 |
| 1,641,138 A | * | 8/1927 | Gibson | F22D 1/325 60/667 |
| 2,025,043 A | | 12/1935 | Dillinger | |
| 2,312,570 A | * | 3/1943 | Meier | C02F 5/02 122/401 |
| 2,515,647 A | * | 7/1950 | Hunt | F24D 1/00 237/9 R |
| 3,469,374 A | * | 9/1969 | Lanzoni | F28B 3/04 96/215 |
| 6,196,163 B1 | | 3/2001 | Shah | |
| 6,402,897 B1 | | 6/2002 | Gunn | |
| 7,331,312 B2 | | 2/2008 | Choi | |
| 7,955,853 B2 | | 6/2011 | Hicks | |
| 2011/0083620 A1 | | 4/2011 | Yoon | |
| 2014/0150736 A1 | * | 6/2014 | Hirata | F22D 1/32 122/441 |

* cited by examiner

*Primary Examiner* — Steven B McAllister
*Assistant Examiner* — Benjamin W Johnson
(74) *Attorney, Agent, or Firm* — Trojan Law Offices

(57) ABSTRACT

An apparatus and method for recovery of waste heat in a boiler system, wherein heat from the low pressure steam in the feed water tank, which otherwise would be lost through dissipation, is used for other applications. Particularly, the waste heat energy recovered in the form of low pressure steam can be used to heat make-up water for the boiler system.

8 Claims, 2 Drawing Sheets

BOILER FEED TANK ENERGY RECAPTURE SYSTEM

CROSS-REFERENCE TO RELATED APPLICATIONS

The present application is a divisional of patent application Ser. No. 15/249,186, entitled "BOILER FEED TANK ENERGY RECOVERY SYSTEM," filed on Aug. 26, 2016. The contents of the aforementioned document are incorporated herein by reference.

FIELD OF THE DISCLOSURE

The present invention relates to an apparatus and method for recovery of waste heat in a boiler system, and more particularly, to an apparatus and method of waste heat recovery that can minimize the amount of waste heat dissipated from a thermal application.

BACKGROUND OF THE INVENTION

A boiler is a closed vessel in which water or other fluid is heated under pressure to create steam. The ability of steam to carry large amounts of thermal energy is the property that makes it an effective working fluid. The generated steam is then circulated out of the boiler for use in various processes or heating applications. In a conventional boiler system, for example, water is heated under pressure in a boiler, creating steam that can be used to actuate a turbine, or used in a steam press. However, in such open systems much of the heat energy can be lost during the process.

In a boiler systems in general, when the properties (i.e. temperature, pressure, volume) of the working fluid are changed as a consequence of work or heat exchange, then it is said that the fluid has gone through a "process." In some processes the relationship between pressure, temperature, and volume are specified as the fluid goes from one thermodynamic state to another. The most common processes are those in which the temperature, pressure, or volume is held constant during the process. If the fluid passes through various processes and then eventually returns to the same state it began with, the system is said to have undergone a cyclic process.

In a general cyclic boiler system, the thermal efficiency of the boiler can be increased by the recovery of waste heat. In such a closed loop system, after water enters a boiler where it is heated by an external heat source to become steam, the pressurized steam can be applied to a steam-powered device to perform some function, such as a steam-powered iron. This results in a decrease in the temperature and pressure of the steam vapor. To recover the waste heat, the vapor is collected in a condenser where it is cooled to become saturated liquid, i.e. warm feed water. This warm feed water is then pumped back into the boiler and the cycle is repeated. Because the waste heat from the steam vapor is recycled as warm feed water back into the boiler, the thermal efficiency of the system is improved.

One method of recovering waste heat is disclosed in U.S. Pat. No. 6,196,163 to Shah. In Shah, heat is recovered by capturing the hot condensate via a reactor steam jacket, then recycling the hot condensate back into the boiler. More specifically, high temperature steam condensate is collected from a reactor steam jacket into a closed vessel in which the pressure is that of the lowest pressure in the reactor steam jacket, but higher than atmospheric, such that there is little or no steam flash over due to a drop in pressure. The steam condensate is then fed back into the boiler. According to Shah, the amount of heat saving to the boiler is the amount of flash over steam saved and hotter condensate returned to the boiler by this method.

The invention described by Shah suffers from a number of disadvantages. For instance, an elaborate system of pumps is necessary for operation of the Shah method, which is not only more costly, but also consumes extra energy to operate and thus results in decreased overall efficiency of the system. More significantly, the boiler cycle described by Shah experiences significant heat loss while the condensate waits in the feed water tank to be fed back to the boiler.

Another method of recovering waste heat is disclosed in U.S. Pat. No. 7,331,312 to Choi. In Choi, the heat is recovered from the feed water in the feed water tank to heat water for a hot water tank. In other words, the Choi invention uses the heat in the boiler system that would be lost to heat water for a second system. Thus, the Choi invention does not increase the efficiency of the boiler system, but increase the efficiency of a second system. Though the Choi system utilize the heat of the feed water in the feed water tank waiting to be cycled back into the boiler, it does not utilize the heat from the low pressure steam in the feed water tank.

The present invention utilizes the heat from the low pressure steam in the feed water tank that forms as the high temperature feed water waits to be fed back to the boiler that would otherwise be lost as it dissipates to the environment to heat the make-up water source, e.g. ground city water. The make-up water is needed to replenish the water lost as the steam utilizing devices uses the steam to perform its process, such as a steam press using steam to iron clothes or other textile articles.

Additionally, the present invention may also utilize the heat that would be lost by the returning condensate and low pressure steam vapor returning to the feed water tank to heat the feed tank water, which otherwise would be lost through dissipation to the air as low-pressure steam. Unlike the Shah invention, which is directed to a method for recapture of lost heat by preventing hot condensate water from flashing through an elaborate set-up of sophisticated equipments, the present invention prevents hot condensate from flashing by shifting the excessive heat for use to heat the water in the feed tank and maintain that water in the feed tank at high temperatures.

Also unlike the Choi invention, the present invention is directed to utilizing the recaptured heat to increase the efficiency of the boiler system. Similarly, the present invention also utilizes the heat from the low pressure steam that is formed as the high temperature feed water in the feed water tank waits to be cycled back into the boiler system.

More generally, in systems wherein waste heat is typically recycled back into the boiler to improve the boiler efficiency, heat is still wasted at the stage when the process steam condenses to water and waits in the feed water tank to be pumped back into the boiler. While waiting in the feed water tank, heat dissipates into the environment. However, the heat energy that is lost from the hot condensate in the boiler system can be recaptured to heat the make-up water and to heat the feed water tank. In the present invention, the waste heat energy recovered in the form of hot condensate feed water can be used to heat the make-up water source and the feed water in the feed tank waiting to be recycled back to the steam boiler.

For the foregoing reasons, there is a need for a method and apparatus for recovering waste heat in a boiler system that can minimize the wasted heat energy in a boiler system.

SUMMARY OF THE INVENTION

The present invention is directed to an apparatus and method for the recovery of waste heat in a boiler system. An apparatus for waste heat recovery having the features of the present invention comprises a closed vessel, e.g. a boiler, for heating liquid under pressure to create a first steam. The closed vessel is connected generally by a steam supply pipe to a steam utilizing device, such as a turbine or steam press, for example. In turn, the steam utilizing device is connected to the feed water tank by a condensate return pipe.

The hot condensate and second steam emitted from the steam utilizing device is collected as feed water in a feed water tank connected to the steam utilizing device by a condensate return pipe. A feed water pump connected to the feed water tank functions to pump the warm feed water back into the boiler. The boiler system as described in this invention is thus comprised of the cyclic process of the water heated in the boiler for application to a steam using device and returning to the boiler as warm feed water.

The boiler system experiences significant heat loss when the process steam condenses to water and waits in the feed water tank to be pumped back into the boiler. As the condensate waits in the feed water tank, the temperature of the feed water cools as low pressure steam forms in the air portions of the feed water tank. The heat from the low pressure steam then dissipates to the environment. The waste heat from the dissipation of heat from the low pressure steam in the feed water tank can be recovered and applied for use in heating the make-up water supply entering the system to replenish the water lost as the steam utilizing devices performs a process. The heat from the returning condensate can also be utilized to heat the water in the feed tank to maintain the feed water at high temperatures. This can be accomplished by placing a heat exchanger in the feed water tank.

Therefore, an apparatus for waste heat recovery having the features of the present invention further comprises a heat exchanger, which is a device for transferring heat from one fluid to another, employed in the steam portion of feed water tank of the boiler system. The heat exchanger has an inlet connection from the make-up water source, e.g. city ground water, and the outlet allows the makeup water source to enter the feed water tank with the heat exchanger located within the low pressure steam portion of the feed water tank.

Additionally, the apparatus for waste heat recovery having the features of the present invention may further comprise a second heat exchanger employed in the feed water tank of the boiler system. The second heat exchanger has inlet connection from the condensate return pipe that is connected to the steam utilizing devices, such as a steam press, and runs through the water portion of the feed tank, and the outlet is located within the steam portion of the feed tank. The outlet portion of the heat exchanger returns the hot condensate and low pressure steam to the feed water tank.

As described above, a heat exchanger is employed in the steam portion of the feed water tank. The heat exchanger is connected to the make-up water source, e.g. city ground water, and allows make-up water to enter the feed tank after being heated by the low pressure steam in the feed water tank that might otherwise be lost through dissipation into the atmosphere.

Additionally, a second heat exchanger may be employed in the water portion of the feed water tank. The second heat exchanger is connected to a the steam utilizing device that returns the low pressure steam back to the feed tank. The condensate and a second steam that is returned back to the feed water tank is recaptured in the heat exchanger to heat the feed water tank and maintain the feed water tank at high temperatures. The higher temperature feed water in the feed water tank may also help the efficiency of the first heat exchanger by increasing the heat in the low pressure steam that can be applied to heat the make-up water entering the system from a make-up water source, e.g., city ground water.

Maintaining the feed water in the feed water tank at higher temperature also helps prevent corrosion in the boiler system. The amount of oxygen absorbed by the water is proportional to the temperature and pressure of the water. The lower the water temperature, the more oxygen the water can absorb. At feed water temperatures above 212° F., there is minimal to no oxygen absorbed by the water. The use of the second heat exchanger can maintain the feed water temperature as high as 207° F. Typical boiler systems maintain feed water around 150° F.

The feed water tank may also employ a chemical inlet connection to allow for treatment of feed water to control pH and to prevent scaling in the system. Acidic boiler water can cause corrosion of the metal parts of the closed boiler system. The chemical inlet is to allow introduction of reagents to combat corrosion and scaling commonly found in closed high pressure steam boiler systems.

In one embodiment of the invention, the inlet connection from the heat exchanger is connected to the make-up water source and the make-up water source enters the feed water tank via a pipe that runs through the steam portion of the feed water tank wherein the make-up water source is heated by the low pressure steam in the feed water tank that would otherwise be lost to dissipation to the environment as it runs through the pipe before entering the feed water tank.

In an embodiment of the invention, the inlet connection from the heat exchanger enters the feed water tank via a tube that runs through the water portion of the feed water tank wherein the heat from the return condensate and low pressure steam heats the water in the feed tank awaiting return back to the steam boiler. The outlet connection from the heat exchanger ends within the steam portion of the feed tank wherein the low pressure steam and condensate from the steam utilizing device is returned back to the feed tank to be cycled through the system again.

In another embodiment of the invention, the inlet connection from the heat exchanger is connected to the make-up water source and is connected via a pipe to the outlet connected to the steam and water mixing chamber located within the steam portion of the feed water tank. The steam and water mixing chamber contain apertures wherein the low pressure steam in the feed water tank is allowed to enter and mix with the make-up water entering the system thereby heating the make-up water source before the make-up water source is allowed to enter the feed tank via apertures on the mixing chamber.

There are several advantages to the present invention. By using recovered waste heat to heat the make-up water source prior to entering the boiler and heating the feed water waiting to be cycled again, the cyclic boiler system efficiency is increased. As described above, this is achieved by the simple use of a heat exchanger between the make-up water source and the low pressure steam in the feed tank and use of a second heat exchanger within the feed water in the feed water tank. The heat exchanger functions to provide efficient heat transfer from the low pressure steam in the feed water tank to the make-up water source and a second heat exchanger to provide efficient heat transfer from the condensate return to feed water thereby pre-heating the make-up water source before entering the boiler and maintaining higher temperature feed water.

BRIEF DESCRIPTION OF THE DRAWINGS

The present teachings may be better understood by reference to the following detailed description taken in connection with the following illustrations, wherein.

DETAILED DESCRIPTION

Figure 1:
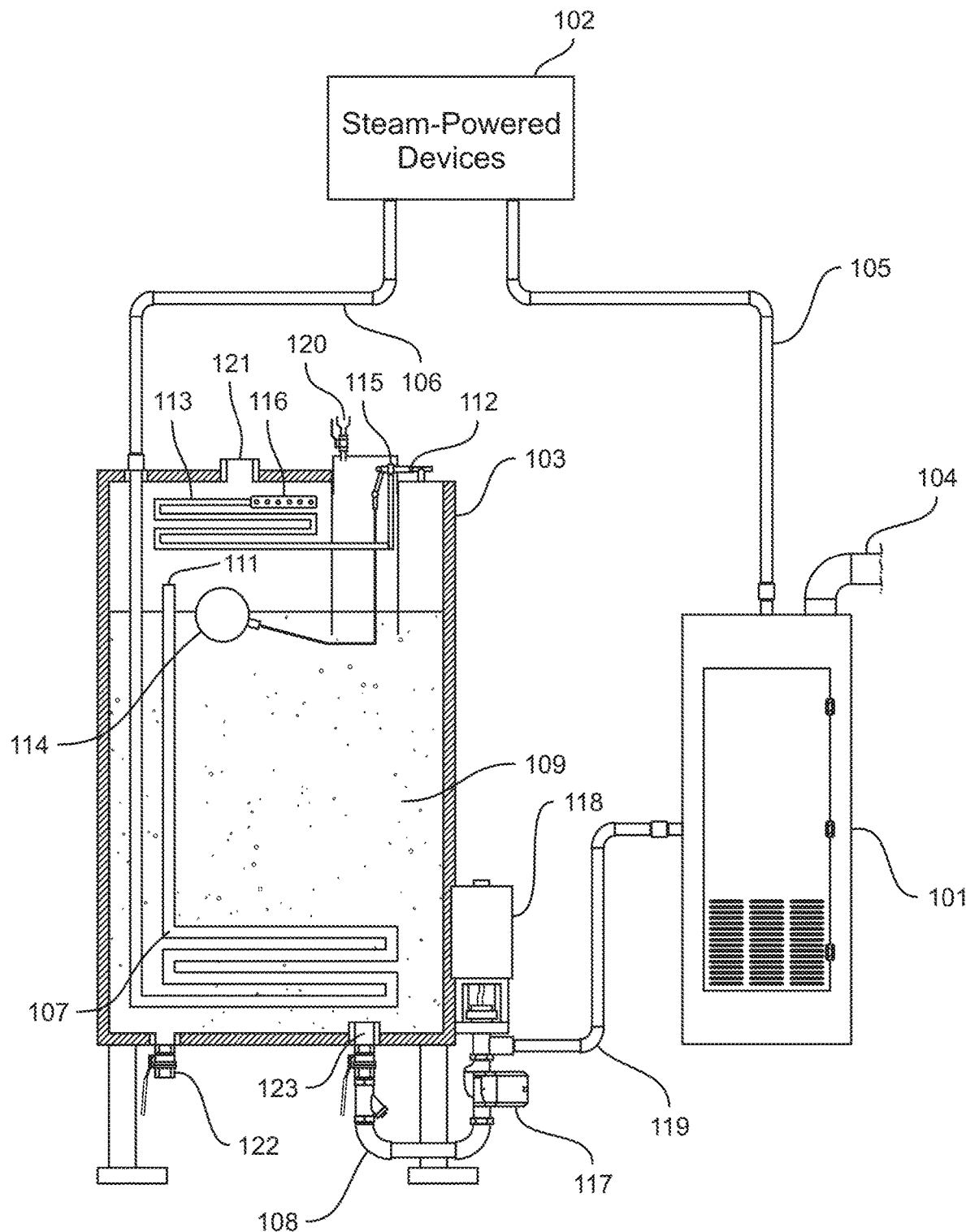
FIG. 1 is a schematic diagram of an embodiment of the invention with a cross-sectional view of the feed water tank.

The following description is made for the purpose of illustrating the general principles of the invention and should not be taken in a limiting sense. The scope of the invention is best determined by reference to the appended claims.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein.

Referring to FIG. 1, an apparatus for waste heat recovery comprises a closed vessel 101 (e.g. a boiler), for heating liquid under pressure to create steam. The closed vessel 101 can be any type of boilers, including (but not limited to) for example conventional gas boilers, condensing boilers, combination boilers, and other types of oil or electric boilers. The boiler depicted closed vessel 101 in FIG. 1 has an exhaust pipe 104.

Closed vessel 101 is connected by a steam supply pipe 105 to steam-powered devices 102. A steam-powered device 105, such as a steam press, utilizes the steam to perform work then emits unused steam, called second steam, and condensate, which is received by the feed water tank 103 through the condensate return pipe 106 which connects the feed water tank 103 and the steam-powered device 105. The condensate return pipe 106 connects to the feed water tank 103 through a second heat exchanger 107, wherein at least one side of the second heat exchanger is in contact with the feed water in the feed water tank 103. The heat from the returning second steam and condensate in the second heat exchanger 107 can be applied to heat the feed water 109 waiting in the feed water tank 103 to be cycled through the closed vessel 101.

The feed water tank 103 may include an outlet 123 that connects to the feed water pipe 108 that is connected to a first water pump 117 that pumps the feed water 109 from the feed water tank 103 to the second water pump 118. The second water pump 118 in turn is connected to the closed vessel 101 by the closed vessel feed water pipe 119.

The outlet for the second heat exchanger 111 allows the condensate and second steam to enter the feed water tank 103 to wait to be pumped back into the closed vessel 101.

The feed water tank 103 may also include a connection to a make-up water source 112, e.g. city ground water. The make-up water source 112 is connected to a first heat exchanger 113 located within the low pressure steam portion 110 of the feed water tank 103. The first heat exchanger 113 applies the recaptured heat from the low pressure steam in the feed water tank to heat the make-up water entering the feed water tank before the make-up water is emitted through a sprayer 116 which regulates the flow of the make-up water entering the feed water tank 103.

The feed water tank 103 may also include a float 114, which is connected to a float valve 115, which can regulate the volume of water in the feed water tank by closing and opening the float valve 115 to stop or start the flow of make-up water from the make-up water source 112.

The feed water tank 103 may include a chemical inlet 120. The chemical inlet 120 allows for the introduction of reagents to control the pH of the feed water in the feed water tank 103 to prevent corrosion of the boiler system and to prevent scaling.

The feed water tank 103 may also include a vent 121 to allow excess steam in the low pressure steam portion 110 of the feed water tank to be released. The feed water tank 103 may also include a feed water drain 122 to drain the feed water tank 103 when necessary for maintenance.

Figure 2:
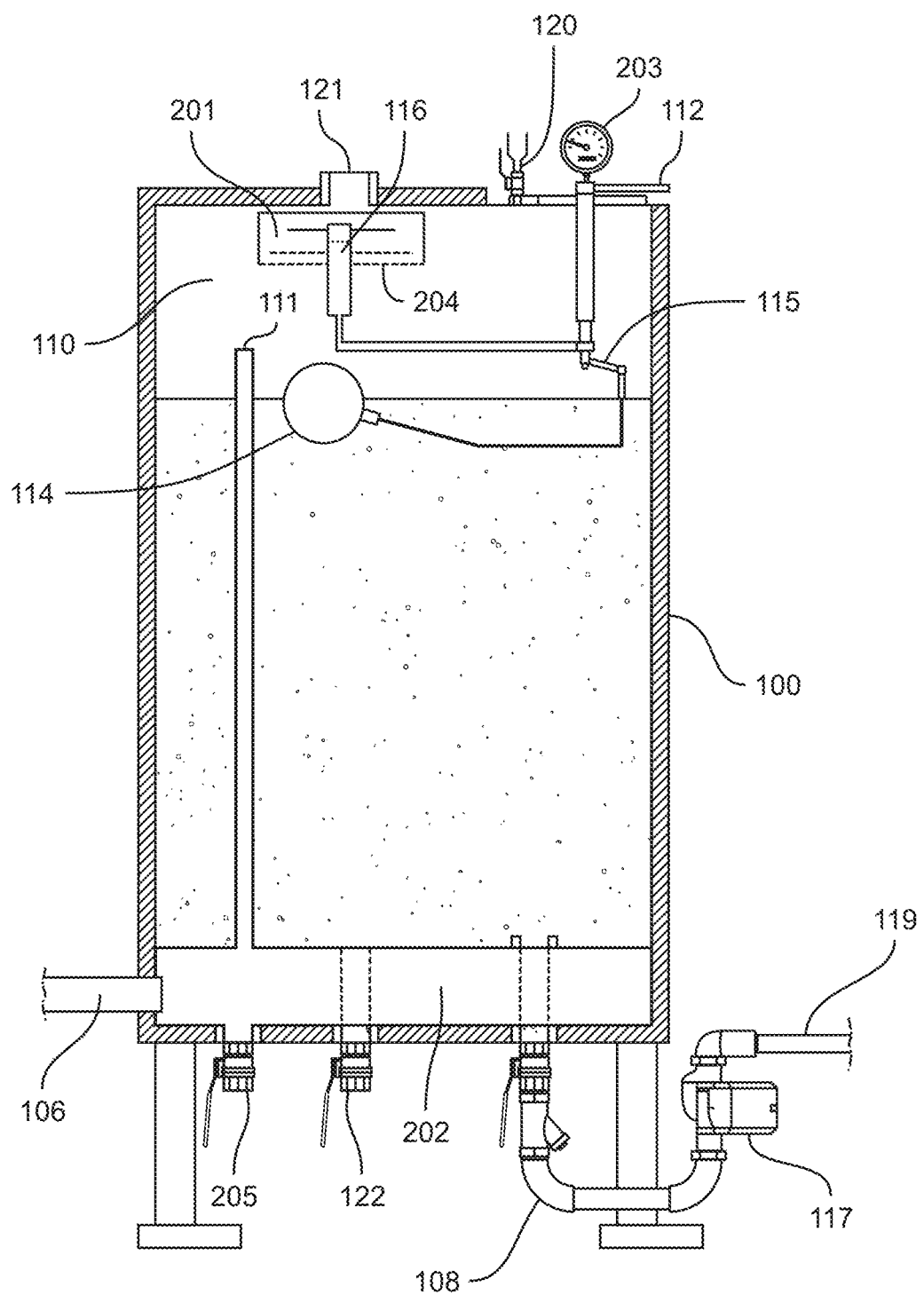
FIG. 2 is a cross sectional view of the feed water tank of the invention including alternate embodiments of the first and second heat exchanger.

Referring to FIG. 2, an alternate embodiment of the first heat exchanger 201 is a steam and water mixing chamber. Steam in the low pressure steam portion 110 of the feed water tank 103 enters the heat exchanger through the apertures 204 in the steam and water mixing chamber 201 which is then allowed to mix with the make-up water entering in through the sprayer 116 from the make-up water source 112. The heat exchanger allows the heat that would be otherwise dissipated through the vent 121 to be recaptured and applied to heat the makeup water entering the first heat exchanger 201 through the make-up water sprayer 116.

The make-up water source 112 may include a pressure gauge 203 to regulate the flow of make-up water entering the steam and water mixing chamber 201 by regulating the water pressure.

An alternate embodiment of the second heat exchanger 202 is shown in FIG. 2. The alternate embodiment of the second heat exchanger 202 allows the heat from condensate returning to the feed water tank 103 to enter into a second heat exchanger 202 and be applied to heat the feed water 109 in the feed water tank. The alternate embodiment of the second heat exchanger 202 is a chamber in the bottom of the feed water tank wherein at least one side of the second heat exchanger is in contact with the feed water in the feed water tank. The heat from the condensate returning to the feed water tank in the second heat exchanger 202 is recaptured and applied to heat the water in the feed water tank through the side of the second heat exchanger 202 that is in contact with the feed water 109 in the feed water tank 103.

The alternate embodiment of the second heat exchanger 202 may include a condensate drain outlet 205 to allow the heat exchanger 202 to be drained as necessary, such as for maintenance.

The different embodiments of the first heat exchanger, 113 and 201, and the different embodiments of the second heat exchanger, 107 and 202 may be used in any combination. For example, the first heat exchanger 113 and the alternate embodiment of the second heat exchanger 202 may be used in combination, or the alternate embodiment of the first heat exchanger 201 may be used in combination with the second heat exchanger 107.

The foregoing description of the embodiments of the present invention has been presented for the purpose of illustration and description. It is not intended to be exhaustive or to limit the invention to the precise form disclosed. Many modifications and variations are possible in light of the above teachings. The numerical values described in the description are only for illustration purpose and should not be understood as limiting the invention to the precise numbers. It is intended that the scope of the present invention not be limited by this detailed description, but by the claims and the equivalents to the claims appended hereto.

What is claimed is:

1. A method for recovering waste heat in a boiler system comprising:
   heating a liquid under pressure in a closed vessel to create a first steam;
   delivering said first steam to a steam utilizing device;
      wherein said steam utilizing device produces a second steam and a condensate after said steam utilizing device utilizes said first steam;
   delivering said condensate and said second steam through a second heat exchanger to a feed water tank to be collected as a feed water, wherein said feed water tank includes a feed water portion and a low pressure steam portion, and wherein said second heat exchanger includes a conduit;
      wherein said feed water is to be delivered to said closed vessel;
      wherein said feed water forms a feed water steam in said low pressure steam portion while said feed water is stored within said feed water portion of said feed water tank;
      wherein at least one side of said second heat exchanger is in contact with said feed water in said feed water portion; and
      wherein said conduit delivers said condensate and said second steam into said low pressure steam portion; and,
   delivering a make-up water through a first heat exchanger having a serpentine conduit through which said make-up water flows upward to said feed water tank to be collected as said feed water;
   wherein said make-up water is heated by the heat of said feed water steam as said make-up water is being delivered to said feed water tank; and,
   wherein said feed water within said feed water tank is heated by the heat of said condensate and the heat of said second steam as said condensate and said second steam are being delivered to said feed water tank.

2. The method of claim 1, further comprising:
   wherein said closed vessel is connected to said steam utilizing device, said steam utilizing device is connected to said feed water tank, and said feed water tank is connected to said closed vessel.

3. The method of claim 1, further comprising:
   pumping said feed water to said closed vessel with a water pump.

4. The method of claim 3, further comprising:
   heating said feed water pumped back to said closed vessel under pressure to create said first steam.

5. The method of claim 1, further comprising:
   wherein said make-up water is delivered to said feed water tank from a make-up water source.

6. The method of claim 5, further comprising:
   controlling a float valve to regulate the volume of said feed water within said feed water tank, wherein said float valve is connected to said make-up water source.

7. The method of claim 1, further comprising:
   introducing reagents to said feed water to control a pH level of said feed water.

8. The method of claim 7, further comprising:
   wherein said pH level of said feed water is controlled to prevent corrosion and to prevent scaling within said boiler system.

* * * * *